United States Patent
Krug et al.

(10) Patent No.: US 6,393,904 B1
(45) Date of Patent: May 28, 2002

(54) STRESS TEST RIG FOR HELICOPTER TRANSMISSIONS

(75) Inventors: Herbert Krug, Hofgeismar; Detlef Brüggemann; Willy Gerd Fischer, both of Ahnatal, all of (DE)

(73) Assignee: ZF Luftfahrttechnik GmbH, Calden (DE)

( * ) Notice: Subject to any disclaimer, the term of this patent is extended or adjusted under 35 U.S.C. 154(b) by 0 days.

(21) Appl. No.: 09/674,726
(22) PCT Filed: May 10, 1999
(86) PCT No.: PCT/EP99/03199
§ 371 (c)(1),
(2), (4) Date: Nov. 3, 2000
(87) PCT Pub. No.: WO99/60362
PCT Pub. Date: Nov. 25, 1999

(30) Foreign Application Priority Data

May 16, 1998 (DE) .......................... 198 22 093

(51) Int. Cl.⁷ .............................................. G01M 19/00
(52) U.S. Cl. ........................................ 73/118.1; 73/841
(58) Field of Search .................... 73/841, 843, 802, 73/118.1, 865.9

(56) References Cited

U.S. PATENT DOCUMENTS

| | | | |
|---|---|---|---|
| 3,460,405 A | 8/1969 | Simmons | 74/801 |
| 4,159,642 A | * 7/1979 | Hudson et al. | 73/118.1 |
| 4,395,904 A | * 8/1983 | Ivanov et al. | 73/118.1 |
| 5,207,097 A | 5/1993 | Gutman | 73/162 |
| 5,307,676 A | 5/1994 | Gutman | 73/162 |
| 5,693,896 A | * 12/1997 | Mistral et al. | 73/865.6 |
| 5,852,793 A | * 12/1998 | Board et al. | 73/56 |

FOREIGN PATENT DOCUMENTS

| | | |
|---|---|---|
| DE | 78 12 143 | 8/1978 |
| DE | 43 25 403 C2 | 11/1995 |
| DE | 196 16 729 A1 | 10/1997 |
| WO | 94/04903 | 3/1994 |
| WO | 97/41415 | 11/1997 |

* cited by examiner

*Primary Examiner*—Max Noori
(74) *Attorney, Agent, or Firm*—Davis & Bujold, P.L.L.C.

(57) ABSTRACT

The inventive stress test rig for helicopter transmission comprises a first test rig transmission (16) which is driven by a motor (38) and forms a closed stress circuit via shafts (4, 14, 54), connecting couplings (12) a stress mechanism (40, 42), a second test rig transmission (52) and a test transmission (2) having a rotor shaft (4) on the output side. To house the test transmission (2), it has a clamping plate (23) which by means of at least one actuator (22) can be rotated about the rotor shaft axis of the test transmission to compensate load-induced displacements at the connecting couplings (12) of the test transmission.

20 Claims, 2 Drawing Sheets

STRESS TEST RIG FOR HELICOPTER TRANSMISSIONS

FIELD OF THE INVENTION

The invention relates to a stress test rig for helicopter transmissions.

BACKGROUND OF THE INVENTION

In DE 196 16 729 A1, a generic stress test rig has been disclosed. One test rig transmission, driven by a motor, is operatively connected via shafts and connecting couplings with a helicopter transmission to be tested which has a rotor shaft on the output side. Situated above the rotor shaft of the test transmission, a second test rig transmission is operatively connected with the rotor shaft. A combination of shafts connecting to the first test rig transmission completes the stress circuit. A stress mechanism is provided for predetermining the stress torque in the stress circuit. By the feedback of power from the test transmission output to the test transmission input, high testing powers are made possible without a correspondingly high expenditure of energy, since only power losses must be applied by the motor in the stress test rig.

During rotation speed reductions, helicopter transmissions branch input powers from one to three prime movers to different outputs like main rotor, rear rotor and auxiliary outputs. The specifically highly stressed transmissions are small and light in design according to the requirements in air travel. The housing are mainly made of aluminum and magnesium alloys. The elasticity modules of the materials are from one half to one third of the elasticity module of steel alloys, i.e. the elastic deformations are accordingly larger under load. A torsion of the transmission housing around the rotor shaft axis particularly occurs.

The consequence of this is that inputs or outputs which are disposed on the transmission at a radial distance from the rotor shaft axis, shift from an initial position. Opposite to the axes of attachable shafts, which lead to the prime movers or to the rear rotor output, the axes of the inputs and outputs of the transmission gearings and radial displacements occur.

In the helicopter, part of this displacements is compensated by non-torsional, angularly movable discs or diaphragm couplings. But a considerable part of the displacements are compensated by the connecting shafts, very long as a rule, leading to the prime movers or to the rear rotor output.

When the transmission is installed in such a stress test rig, the installation situation of the transmission is extensively simulated in the helicopter cell. For reasons of technical economy and space, however, substantially shorter input and output shafts are being used.

On account of the short shafts, a large part of the displacements must be compensated by the coupling elements. Together with substantially high load of the coupling elements due to the large angles, there also appear on the input and output shafts of the helicopter transmission substantially high bearing loads in a radial direction. The heavy loads simultaneously with very high rotational speeds of up to about 25,000 1/min (revolutions per minute) can result in destruction of the coupling elements and damage to the supporting range of the input and output points and on the highly sensitive free wheels of the helicopter transmission. But the stresses in the test rig must not exceed the operating loads on the helicopter or, in the worst case, cause damage to the transmission.

U.S. Pat. No. 5,207,676 has disclosed a gear cutting test machine having devices for position changes of the individual gear wheels geared with each other.

The problem on which the invention is based is to further develop a generic stress test rig so that, as exact as possible, a simulation of the loads appearing on the helicopter is made possible in a small space. The stress test rig must be flexibly adaptable to different types of helicopter transmissions and load profiles, and operate safely within admissible loads or damages.

SUMMARY OF INVENTION

The problem is solved by the fact that a clamping plate, rotatable by at least one actuator around the rotor shaft axis of the test transmission, is provided for supporting the test transmission. The arrangement makes it possible, wholly or partly, to compensate for the displacements appearing under load on the connecting couplings of the test transmission.

In an advantageous development of the invention, the rotatable clamping plate and the actuators are situated on an assembly truck which accommodates the test transmission and all necessary adaptation devices, e.g. adaptative transmissions. In connection with this invention, the use of an assembly truck offers the advantage that with simple means an individual adaptation for different types of helicopter transmission is possible. The connecting points for transmission bottoms or bottom flange of the test transmission are situated in the clamping plate so that the axis of rotation of the clamping plate coincides at least approximately with the rotor shaft axis. The arrangement of the clamping plate of the actuators and, if needed, the required adaptation transmission on the assembly truck makes possible a standardized connecting point of assembly truck to test rig.

An advantageous arrangement of the actuators results when two symmetrically opposite actuators are provided, each of which is situated tangentially to the direction of rotation of the clamping plate between a connecting point on the clamping plate and a connecting point on the assembly truck. By virtue of this arrangement, the support of the rotatable clamping plate on the assembly truck remains at least approximately free of radial forces.

Stresses can be avoided by an axially movable support of the clamping plate in a direction along the axis of rotation.

In an advantageous development of the invention, the stress mechanism has a stress motor with an electric stress torque regulator unit controlled by a microprocessor and an overlay transmission. The stress-torque dependent control of the actuators is simplified, especially when an electronic actuator-control regulator unit with a signal input for theoretical stress torque value and at least one signal output for a theoretical position value of an actuator or of the clamping plate is provided.

On account of the short shafts, a large part of the displacements must be compensated by the coupling elements. Together with substantially high load of the coupling elements due to the large angles, there also appear on the input and output shafts of the helicopter transmission substantially high bearing loads in a radial direction. The heavy loads simultaneously with very high rotational speeds of up to about 25,000 1/min (revolutions per minute) can result in destruction of the coupling elements and damage to the supporting range of the input and output points and on the highly sensitive free wheels of the helicopter transmission. But the stresses in the test rig must not exceed the operating loads on the helicopter or, in the worst case, cause damage to the transmission.

Great security can be obtained when in the stress circuit at least one torque sensor is situated and the electronic actuator-control regulator unit has at least one signal input for an actual value of the stress torque of the torque sensor or when at least one sensor is provided for the actual position value of an actuator or of the clamping plate.

BRIEF DESCRIPTION OF THE DRAWINGS

The invention is shown in detail with reference to the drawings wherein.

DESCRIPTION OF THE PREFERRED EMBODIMENTS

Figure 1:
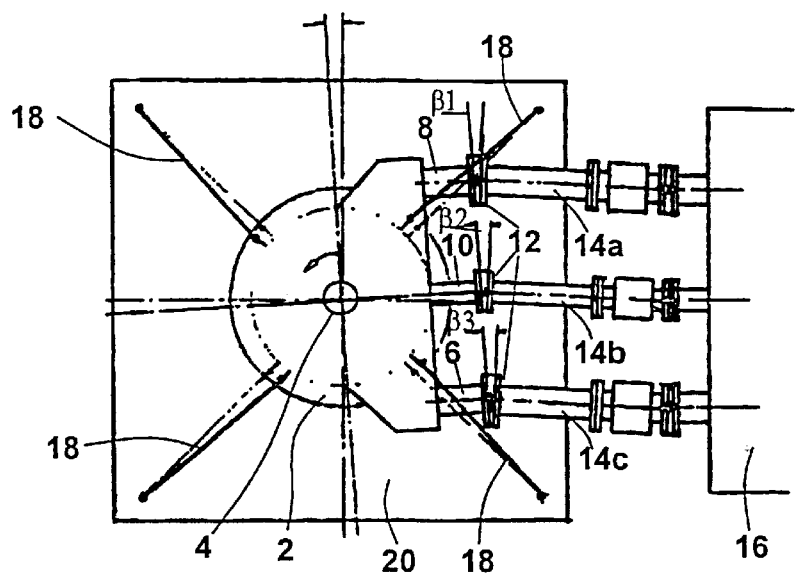
FIG. 1 is a diagrammatic top view on one part of a stress test rig known already.

The well known test transmission 2, shown in FIG. 1, has a rotor shaft 4 extending perpendicular to the drawing plane. The rotor shaft is operatively connected with an upper test rig transmission 52 (not shown). Situated on the side of the test transmission 2 are two inputs 6, 8 and one output 10 leading to the rear rotor. They are operatively connected by means of connecting couplings 12 and shafts 14A, 14B, 14C with corresponding outputs and inputs of the lower test rig transmission 16. The test transmission 2 is fixed by means of four struts 18 upon an assembly truck 20 that can be fastened in the test rig. Occurring under load, a reaction torque of the test transmission 2 occurs and is transmitted essentially by means of transmission bottoms, bottom flanges or horizontal struts (not shown) to the assembly truck 20. The reaction torque, which results in a housing deformation of the test transmission 2, acts under load between the connecting points and the rotor shaft.

As consequence of the deformation of the housing, the laterally situated inputs and outputs 6, 8, 10 are bent relative to the connecting shafts 14A, 14B, 14C connecting to the test rig transmission 16 by the angles β1, β2, β3. Designed as discs or diaphragm couplings, the connecting couplings 12 can compensate, to a certain extent, for the displacement. But as result of the shorter connecting shafts 14A, 14B, 14C relative to the installation in a helicopter and of the high rotational speeds of up to 25,000 1/min (revolutions per minute), the loads on the connecting couplings 12 are considerable, which can lead to damage in the connecting couplings. The radial forces on the inputs and outputs 6, 8, 10 are also substantially stronger than in the helicopter installation.

Figure 2:
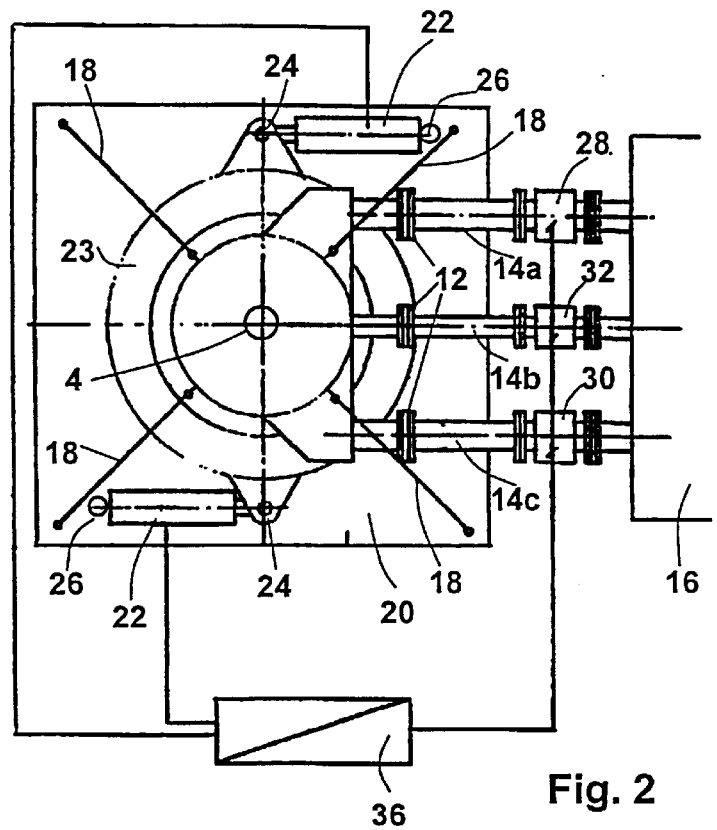
FIG. 2 is a diagrammatic top view of one part of an inventive stress test.

FIG. 2 diagrammatically shows one part of an inventive stress test rig in top view. The displacement occurring under load on the connecting couplings 12 are compensated by a clamping plate 23 rotatable around the axis of the rotor shaft 4. The clamping plate rotates, relative to the assembly truck 20, by virtue of two hydraulically or electrically operated actuators 22, which, symmetrically opposite each other, and are situated tangentially to the direction of rotation of the clamping plate between one connecting point 24 of the clamping plate and one connecting point 26 of the assembly truck.

Figure 4:
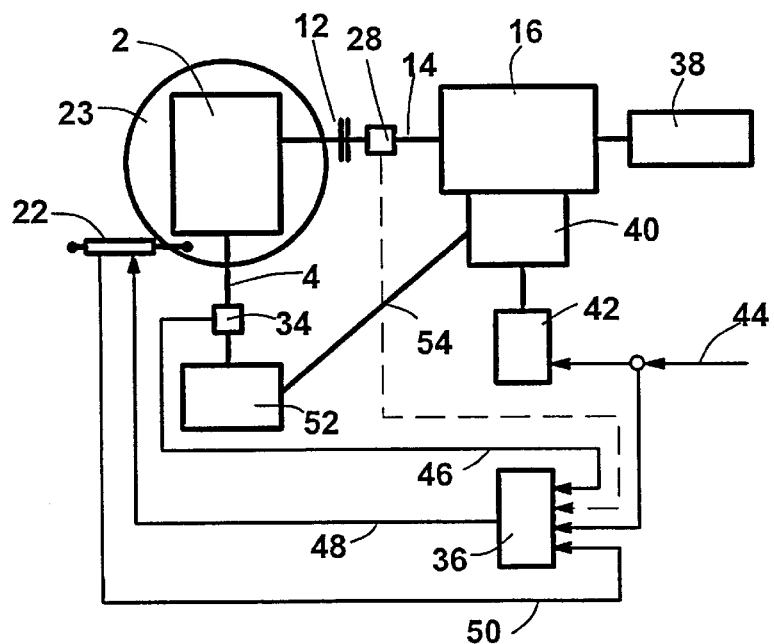
FIG. 4 is a diagrammatic representation of the control of the stress test rig.

In these connecting shafts 14A, 14B, 14C between the upper and lower test rig transmissions 16, 52 and inputs and outputs of the test transmission 2, sensors 28, 30, 32, 34 are disposed for determining the actual value of the stress torque (FIG. 4). This can be determined from the sum of the signal values of the torque sensors 28, 30 and 32 or from the signal value of the torque sensor 34 disposed on the rotor shaft. The actuator-control regulator unit 36, shown in FIG. 2, has a signal input for the actual value of the torque of the stress torque and signal outputs for theoretical values of the position of the actuators 22. Depending on the signal input, the signal outputs are measured, e.g. by a linear interrelation with the signal input so as to compensate for the displacement on the connecting couplings 12. Other methods are described with reference to FIG. 4.

Figure 3:
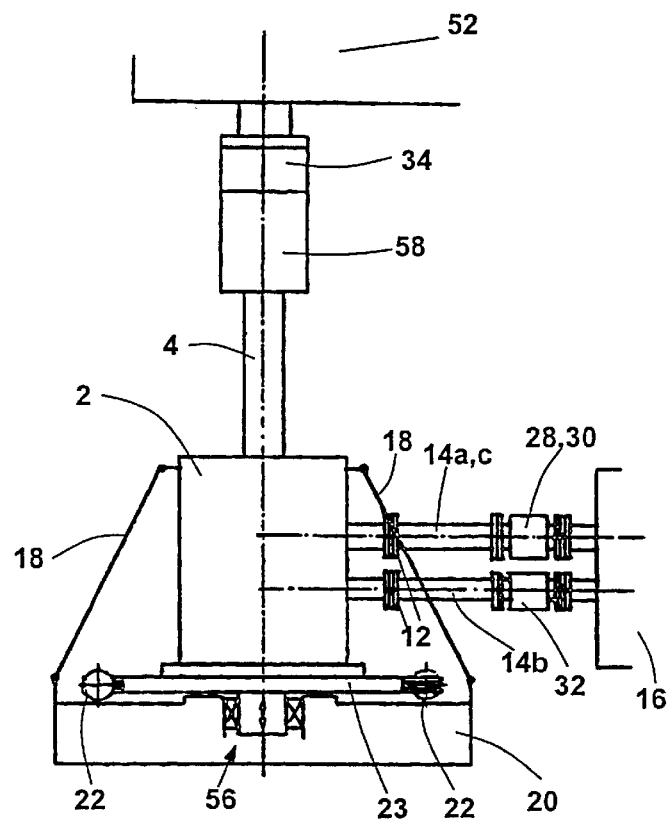
FIG. 3 is a diagrammatic side view of one part of an inventive stress test rig.

FIG. 3 shows a diagrammatic side view representation of one part of an inventive stress test rig. Parts corresponding to each other are provided with the same reference numerals. The test transmission transmits the reaction torque originating in the ratio via bottom flanges (not shown) to the clamping plate 23 rotatable around the axis of the rotor shaft. The struts 18, additionally placed between test transmission and assembly truck, transmit to the helicopter in essence the vertical forces appearing between rotor and helicopter cell; the same forces developed by pitching and rolling torques. The clamping plate 23 is axially movably supported with the bearing 56 in the assembly truck 20 relative to the torsion axis or the rotor shaft axis. Hereby stresses are prevented. The rotor shaft 4 is connected via a coupling 58 with the upper test rig transmission 52. A torque sensor 34 is located between rotor shaft 4 and upper test rig transmission 52. The upper test rig transmission 52 is coupled by shaft connections (not shown in FIG. 3) with the lower test rig transmission 16 whereby the stress circuit is completed.

FIG. 4 diagrammatically shows a test rig construction and the control devices. The motor 38 drives the lower test rig transmission 16 and compensates for any power losses occurring in the stress circuit. The stress circuit between lower test rig transmission 16 and upper test rig transmission 52 is closed by the shaft 54 and the overlay transmission 40. The overlay transmission 40 has an input from a stress motor with an electric stress-torque regulator unit 42 controlled by microprocessor. The stress mechanism 40, 42 produces, depending on the stress-torque theoretical value 44, the stress torque in the stress circuit. Construction and mode of operation of the stress mechanism are not an object of this invention.

The electronic actuator-control regulator unit 36 receives the signal of the stress-torque nominal value 44 and issues a theoretical position value 48 for the actuator 22. In the simplest case, there is a linear interrelation between the two signals. Since the theoretical stress-torque nominal value 44 is a control variable, a time characteristic caused by a feedback is prevented. In principle, it is also possible to use an actual stress-torque value 46 of a torque sensor 34 for producing the theoretical position value 48. If the actuator-control regulator unit 36 has a signal input for the stress-torque nominal value 44 and a signal input for the theoretical stress-torque value 35, by comparing the signals, an erroneous operation of the test rig can be diagnosed, if needed, in order to disconnect the test rig to prevent damages. Besides, if the actuator-regulator control unit 36 evaluates a signal 50 of a sensor for the actual position value, an erroneous operation of the actuator can also be determined. If the actual position value falls back by a certain amount from the theoretical position value, it is, likewise, possible to assume an erroneous operation or react accordingly. When the actual stress-torque value 46 suddenly drops as result of an operation failure, the actuators 22 are immediately moved to an accelerated emergency operation in a neutral normal position.

REFERENCE NUMERALS 2 test transmission
4 rotor shaft
6 input
8 input
10 output
12 connecting coupling
14A, B, C
16 lower test rig transmission
18 strut
20 assembly truck
22 actuator
23 clamping plate
24 connecting point
26 connecting point
28 torque sensor
30 torque sensor
32 torque sensor
34 torque sensor
36 actuator-control regulation unit
38 motor
40 overlay transmission
42 stress motor with microprocessor-shafts control regulator unit
44 theoretical stress-torque value
48 theoretical position value
50 actual position value
52 upper test rig transmission
54 shaft
56 bearing
58 coupling
β1, 2, 3 angle

What is claimed is:

1. A stress test rig for testing a helicopter transmission, the stress test rig comprising:
   a lower test rig transmission (16) for connection to an input of a transmission (2) to be tested in which the transmission (2) to be tested has at least a rotor shaft (4) as an output thereof;
   an upper test rig transmission (52) for connection to the rotor shaft (4) of the transmission (2) to be tested;
   a motor (38) for driving the lower test rig transmission (16) to supply a driving input to the transmission (2) to be tested;
   a stress circuit formed via connecting couplings (12, 58) connected to the input and the rotor shaft output of the transmission (2) to be tested, and a stress mechanism (40, 42) linking the upper test rig transmission (52) to the lower test rig transmission (16);
   wherein a clamping plate (23) is supported by the stress test rig and the clamping plate (23) is rotatable relative to a remainder of the stress test rig, via at least one actuator (22) connected to the clamping plate (23), about a rotational axis of the rotor shaft (4) of the transmission (2) to be tested to compensate for displacement occurring under load on the connecting couplings (12, 58).

2. The stress test rig according to claim 1, wherein an assembly platform (20) supports at least the clamping plate (23) and the at least one actuator (22) to facilitate rotation of the clamping plate (23) relative to the remainder of the stress test rig.

3. The stress test rig according to claim 2, wherein the at least one actuator (22) comprises a first actuator (22) and a second actuator (22), the first actuator (22) and second actuator (22) are located symmetrically on opposing sides of the clamping plate (23) and extend tangentially to a rotational direction of the clamping plate (23) to facilitate rotation of the clamping plate (23) about a central axis.

4. The stress test rig according to claim 1, wherein a bearing (56) supports the clamping plate (23) so that the clamping plate (23) is axially movably supported relative to the rotational direction of the clamping plate (23).

5. The stress test rig according to claim 1, wherein the stress mechanism (40, 42) comprises an overlay transmission (40) coupled to a stress motor with an electric microprocessor-controlled regulator unit (42) for providing an input to the stress mechanism (40, 42).

6. The stress test rig according to claim 1, wherein an electronic actuator-control regulator unit (36) receives a stress-torque nominal value (44) as an input signal and the electronic actuator-control regulator unit (36) outputs a nominal position value (48) as an output signal to at least one of the at least one actuator (22) and the clamping plate (23) for stress dependent control of the at least one actuator (22).

7. The stress test rig according to claim 6, wherein at least one torque sensor (34) forms part of the stress circuit and the electronic actuator-control regulator unit (36) receives an actual stress-torque value (46) from torque sensor (34) to facilitate stress dependent control of the at least one actuator (22).

8. The stress test rig according to claim 1, wherein at least one sensor is provided for supplying an actual position value (50) of at least one the at least one actuator (22) and the clamping plate (23).

9. A method of operating a stress test rig for testing helicopter transmissions, the stress test rig comprising:
   a lower test rig transmission (16) for connection to an input of a transmission (2) to be tested in which the transmission (2) to be tested has at least a rotor shaft (4) as an output thereof;
   an upper test rig transmission (52) for connection to the rotor shaft (4) of the transmission (2) to be tested;
   a motor (38) for driving the lower test rig transmission (16) to supply a driving input to the transmission (2) to be tested;
   a stress circuit formed via connecting couplings (12, 58) connected to the input and the rotor shaft output of the transmission (2) to be tested, and a stress mechanism (40, 42) linking the upper test rig transmission (52) to the lower test rig transmission (16);
   wherein a clamping plate (23) is supported by the stress test rig and the clamping plate (23) is rotatable relative to a remainder of the stress test rig, via at least one actuator (22) connected to the clamping plate (23), about a rotational axis of the rotor shaft (4) of the transmission (2) to be tested to compensate for displacement occurring under load on the connecting couplings (12, 58);
   the method comprising the steps of:
       controlling the at least one actuator (22) depending upon a stress-torque signal in the stress circuit; and
       compensating for displacements of the connecting couplings (12, 58) of the transmission (2) to be tested as a consequence to the stress-torque signal.

10. The method of operating a stress test rig according to claim 9, further comprising the step of controlling the at least one actuator (22) depending upon a stress-torque nominal value signal (44).

11. The method of operating a stress test rig according to claim 10, further comprising the step of compensating for, via in an electronic actuator-control regulator unit (36), the values of the stress-torque actual value signal (46) and the stress-torque nominal value signal (44) for detecting an erroneous operation of the stress test rig.

12. The method of operating a stress test rig according to claim 9, further comprising the step of comparing, via in an electronic actuator-control regulator unit (36), an actual position value (50) and a nominal value (48) for detecting an erroneous operation of the stress test rig.

13. The method of operating a stress test rig according to claim 11, further comprising the step of, in an event of a sudden drop of the stress-torque actual value signal resulting from an erroneous operation of the stress test rig, moving the at least one actuator (22) to a neutral position.

14. A stress test rig for testing a helicopter transmission, the stress test rig comprising:

a first test rig transmission (16) for connection to an input of a transmission (2) to be tested in which the transmission (2) to be tested has at least a rotor shaft (4) as an output thereof;

a second test rig transmission (52) for connection to the rotor shaft (4) of the transmission (2) to be tested;

a motor (38) for driving the first test rig transmission (16) to supply a driving input to the transmission (2) to be tested;

a stress circuit formed via a connecting coupling (12) connected to the input of the transmission (2) to be tested and a connecting coupling (58) connected to the rotor shaft output of the transmission (2) to be tested, and a stress mechanism (40, 42, 54) linking the second test rig transmission (52) to the first test rig transmission (16);

wherein a clamping device (23) is rotatable relative to a remainder of the stress test rig, about a rotational axis of the rotor shaft (4) of the transmission (2) to be tested, via at least one actuator (22) connected to the clamping device (23) to compensate for displacement occurring under load on the connecting couplings (12, 58).

15. The stress test rig according to claim 14, wherein an assembly platform (20) supports at least the clamping device (23) and the at least one actuator (22) to facilitate rotation of the clamping device (23) relative to the remainder of the stress test rig.

16. The stress test rig according to claim 15, wherein the at least one actuator (22) comprises a first actuator (22) and a second actuator (22), the first actuator (22) and second actuator (22) are located symmetrically on opposing sides of the clamping device (23) and extend tangentially to a periphery of the clamping device (23) to facilitate rotation of the clamping device (23) about a central axis.

17. The stress test rig according to claim 14, wherein a bearing (56) supports the clamping device (23) so that the clamping device (23) is axially movably supported relative to the rotational direction of the clamping device (23).

18. The stress test rig according to claim 14, wherein the stress mechanism (40, 42) comprises an overlay transmission (40) coupled to a stress motor with an electric microprocessor-controlled regulator unit (42) for providing an input to the stress mechanism (40, 42).

19. The stress test rig according to claim 1, wherein an electronic actuator-control regulator unit (36) receives a stress-torque nominal value (44) as an input signal and the electronic actuator-control regulator unit (36) outputs a nominal position value (48) as an output signal to at least one of the at least one actuator (22) and the clamping device (23) for stress dependent control of the at least one actuator (22).

20. The stress test rig according to claim 19, wherein at least one torque sensor (34) forms part of the stress circuit and the electronic actuator-control regulator unit (36) receives an actual stress-torque value (46) from torque sensor (34) to facilitate stress dependent control of the at least one actuator (22).

* * * * *